(12) United States Patent
Okamoto et al.

(10) Patent No.: US 11,460,080 B2
(45) Date of Patent: Oct. 4, 2022

(54) VALVE UNIT (71) Applicant: Kubota Corporation, Osaka (JP)

(72) Inventors: Naoya Okamoto, Sakai (JP); Norita Tottori, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/095,720

(22) Filed: Nov. 11, 2020

(65) Prior Publication Data

US 2021/0199138 A1    Jul. 1, 2021

(30) Foreign Application Priority Data

Dec. 26, 2019  (JP) .............................. JP2019-237396

(51) Int. Cl.
*F16D 48/02* (2006.01)
*F15B 7/06* (2006.01)

(52) U.S. Cl.
CPC ............... *F16D 48/02* (2013.01); *F15B 7/06* (2013.01); *F15B 2211/522* (2013.01)

(58) Field of Classification Search
CPC .......................... F15B 13/025; F15B 2211/55; F16H 61/4139; F16K 31/0665; F16D 48/02
See application file for complete search history.

(56) References Cited

U.S. PATENT DOCUMENTS

| 2,420,554 | A | * | 5/1947 | Mott | F15B 13/025 137/596.12 |
| 4,034,563 | A | * | 7/1977 | Orth | F15B 11/16 60/427 |
| 5,599,247 | A | | 2/1997 | Matsufuji | |
| 6,601,474 | B2 | * | 8/2003 | Ishimaru | B60K 17/105 180/247 |
| 7,047,839 | B2 | * | 5/2006 | Ishii | B60K 17/105 180/344 |
| 9,151,301 | B2 | * | 10/2015 | Combley | F15B 13/025 |
| 10,030,766 | B2 | | 7/2018 | Nagasato et al. | |

FOREIGN PATENT DOCUMENTS

| JP | 5193509 A | 8/1993 |
| JP | H828601 A | 2/1996 |
| JP | 8156620 A | 6/1996 |
| JP | 2009168218 A | 7/2009 |

* cited by examiner

*Primary Examiner* — Thomas E Lazo
*Assistant Examiner* — Daniel S Collins
(74) *Attorney, Agent, or Firm* — The Webb Law Firm (57) ABSTRACT

A valve unit (V) has a valve housing (50) that includes a supply oil passage (55) configured to receive operating oil from a hydraulic pump, and a pressure adjustment valve (Va) configured to adjust the pressure of the supply oil passage (55). The pressure adjustment valve (Va) includes a pressure adjustment valve body (61) configured to open and close the supply oil passage (55), a compression coil spring (62) that keeps the pressure adjustment valve body (61) at a closed position when the pressure of the supply oil passage (55) is smaller than a set value and allows the pressure adjustment valve body (61) to open when the pressure of the supply oil passage (55) is not smaller than the set value, and a restriction member (63) configured to, when the pressure adjustment valve body (61) becomes open against the urging force of the spring (62) in response to a pressure of the operating oil, abut against the pressure adjustment valve body (61) to restrict movement of the pressure adjustment valve body (61).

4 Claims, 9 Drawing Sheets

VALVE UNIT

CROSS-REFERENCE TO RELATED APPLICATION

This application claims priority to Japanese Patent Application No. 2019-237396 filed Dec. 26, 2019, the disclosure of which is hereby incorporated by reference in its entirety.

BACKGROUND OF THE INVENTION

1. Field of the Invention

The present invention relates to a valve unit including a pressure adjustment valve configured to adjust the pressure of operating oil.

2. Description of Related Art

JP H08-028601 A discloses a relief valve of a hydraulic, gradual increase type configured to adjust the pressure of operating oil to be supplied to a hydraulic clutch.

In a valve unit thereof, a cylindrical valve case is housed in a valve housing; and a relief valve body and a control piston are housed in the valve case, with a spring being arranged between the relief valve body and the control piston.

JP H08-028601 A discloses an oil chamber that has a pump port communicating with an operating oil supply passage, and an oil drain port for discharging operating oil, wherein the pressure of the operating oil supply passage is applied to the control piston via an orifice.

The relief valve in JPH08-028601A is configured to perform pressure control, wherein, when operating oil is to be supplied to the hydraulic clutch, the relief valve is configured to gradually increase the pressure of the operating oil first, and then raise the pressure of the operating oil to a required level.

The relief valve disclosed in JP H08-028601 A is capable of gradually increasing the pressure on the clutch, and is thus capable of reducing a shock occurring when the clutch is engaged. The relief valve, however, has a complicated structure and leads to a cost increase.

In a hydraulic circuit for a rotary tiller device or the like that is connectable to a tractor, for example, it requires transmission of a driving force to be permitted and blocked rapidly. In such a hydraulic circuit, it is supposedly sufficient to provide a pressure adjustment valve that may obtain a pressure necessary to keep the clutch engaged.

Cost reduction may be realized if a pressure adjustment valve in the form of a relief valve is employed, including a valve body and a spring for urging the valve body to be closed. However, repeated compression of the spring decreases its urging force to be applied to the valve body, disadvantageously leading to inappropriate pressure adjustment.

Under such circumstances, there is a need for a valve unit that may perform appropriate pressure adjustment continuously.

SUMMARY OF THE INVENTION

In view of the above, an aspect of the present invention is as below:

A valve unit comprising:
a valve housing including: a supply oil passage configured to receive operating oil from a hydraulic pump, and a pressure adjustment valve configured to adjust a pressure of the supply oil passage,
wherein the pressure adjustment valve includes:
a pressure adjustment valve body configured to open and close the supply oil passage;
a compression coil spring applying, to the pressure adjustment valve body, an urging force that keeps the pressure adjustment valve body at a closed position when the pressure of the supply oil passage is smaller than a set value and that allows the pressure adjustment valve body to open when the pressure of the supply oil passage is not smaller than the set value; and
a restriction member configured to, when the pressure adjustment valve body becomes open against the urging force of the spring in response to a pressure of the operating oil, abut against the pressure adjustment valve body in such a manner as to restrict movement of the pressure adjustment valve body.

The above characteristic arrangement involves keeping the pressure adjustment valve body at a closed position when the pressure of the supply oil passage is smaller than a set value and allowing the pressure adjustment valve body to open when the pressure of the supply oil passage is not smaller than the set value. This allows the supply oil passage to keep its pressure at not smaller than the set value. The above characteristic arrangement also includes a restriction member configured to restrict the amount of movement of the pressure adjustment valve body if the pressure of the supply oil passage has been increased sharply. This prevents the spring from becoming compressed greatly, and thereby prevents a decrease in its urging force.

The above characteristic arrangement thereby allows a valve unit capable of continuing appropriate pressure adjustment to be produced without a cost increase.

In one preferred embodiment:
the pressure adjustment valve body has an operation axis along which the pressure adjustment valve body is operated,
the spring includes a coil having a center, and
the restriction member is in a shape of a shaft having an axis,
wherein the operation axis of the pressure adjustment valve body, the center of the coil of the spring, and the axis of the restriction member extend concentric with one another, and
the restriction member is present inside the coil of the spring.

The above arrangement places a bar-shaped restriction member inside the coil of the spring. The restriction member can thus prevent excessive compression of the spring without the need to have a complicated structure.

In one preferred embodiment:
the hydraulic pump is provided for a work machine that includes a power steering unit of a hydraulic type and a continuously variable transmission device of a hydrostatic type,
the supply oil passage receives, upstream of the pressure adjustment valve, the operating oil having passed through the power steering unit, and the operating oil downstream of the pressure adjustment valve in the supply oil passage is supplied to the continuously variable transmission device as charge oil.

The above arrangement allows operating oil from the hydraulic pump to be supplied sequentially to the power steering unit, the valve unit, and the continuously variable transmission device in this order. The arrangement in this order allows (i) operating oil with a high pressure to be supplied to the power steering unit, (ii) operating oil with a pressure lower than the above pressure to be supplied via the valve unit to, for example, a hydraulic clutch, and (iii) operating oil with a pressure even lower than the above pressure to be supplied to the continuously variable transmission device as charge oil. The above arrangement thus makes it possible to avoid wasting operating oil and eliminates the need to include a plurality of hydraulic pumps.

In one preferred embodiment:

the valve housing includes a pump port through which the operating oil is supplied from the hydraulic pump to the supply oil passage, and a discharge port through which the operating oil downstream of the pressure adjustment valve in the supply oil passage is discharged, the valve housing includes a branch oil passage that is branched out of the supply oil passage and that is configured to receive the operating oil upstream of the pressure adjustment valve in the supply oil passage, the valve housing has a control port through which the operating oil from the branch oil passage exits, and there is provided a solenoid valve that is configured to electromagnetically open and close the branch oil passage.

The above arrangement allows operating oil from the hydraulic pump to be supplied through the pump port to the supply oil passage. This allows the pressure adjustment valve to keep the pressure of the supply oil passage at not smaller than the set value. The above arrangement also allows operating oil from a portion of the supply oil passage which portion is upstream of the pressure adjustment valve to flow into a branch oil passage. This operating oil can then be supplied under control of a solenoid valve through the control port to an external hydraulic device. The above arrangement also allows operating oil discharged through the discharge port to be supplied to another hydraulic device if the pressure of the supply oil passage is not smaller than the set value.

In addition thereto, the operating oil exiting through the control port may be supplied to a friction clutch, and the pressure set by the pressure adjustment valve may be a value sufficient to keep the friction clutch engaged.

Typically, such a friction clutch can be kept engaged even with the operating oil having a lower pressure, compared with the pressure of operating oil to be supplied to a hydraulic cylinder that drives e.g. a bucket and an arm of an excavator adapted to be connected to a tractor. Thus, with the above arrangement, operating oil supplied through the control port has a relatively low pressure. This allows the pressure on the spring to be relatively small, and effectively prevents plastic deformation of the spring.

Other aspects of the invention and advantages expected therefrom will be apparent upon reading following detailed description.

DETAILED DESCRIPTION OF PREFERRED EMBODIMENTS

An embodiment of the invention will be described hereinafter with reference to the drawings.

[Overall Configuration]

Figure 1:
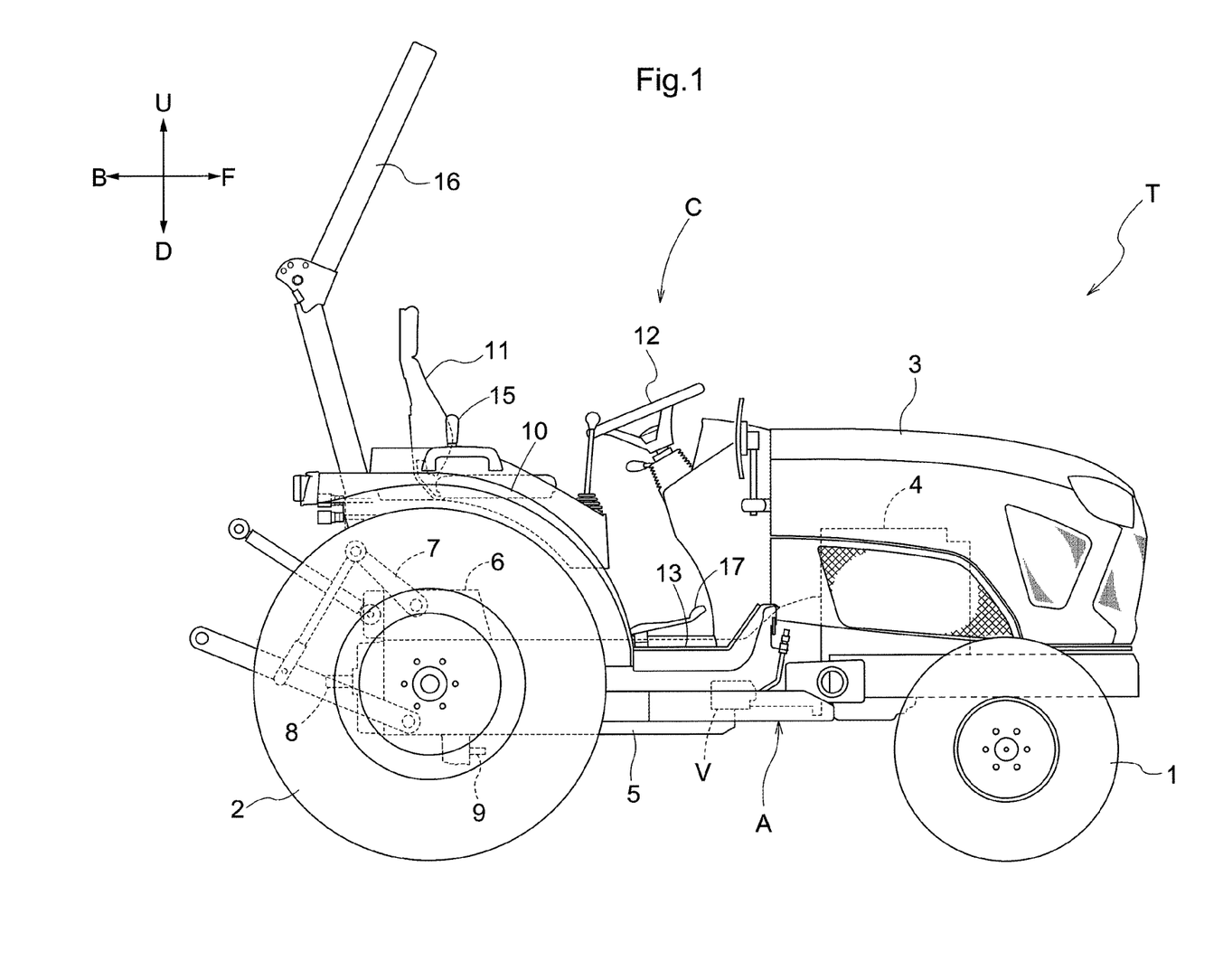
FIG. 1 is a side view of a tractor.
Figure 2:
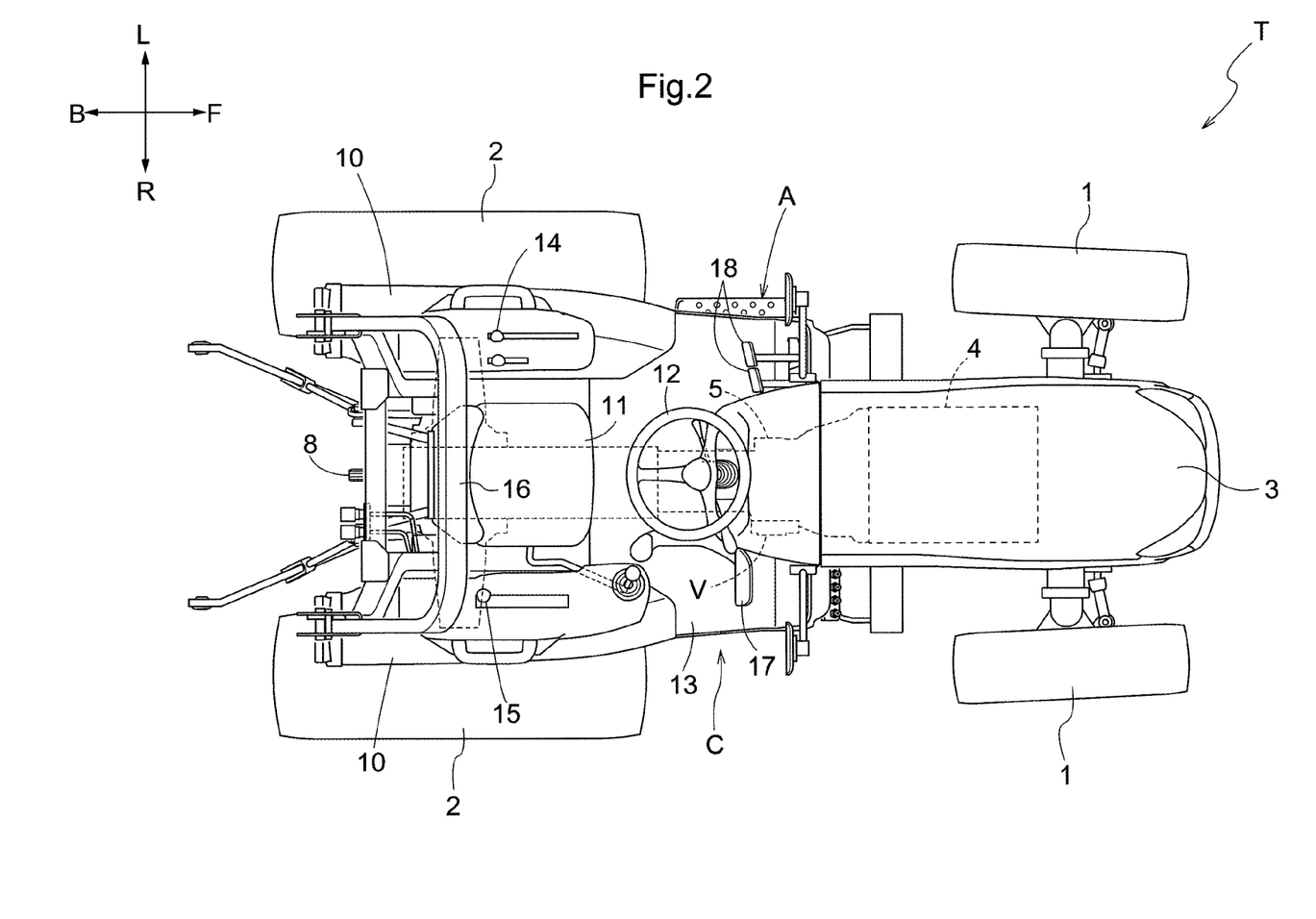
FIG. 2 is a top plan view of the tractor.

As shown in FIGS. 1 and 2, a tractor T is illustrated as an exemplary work machine (work vehicle), including a machine body A provided with a pair of right and left front wheels 1 and a pair of right and left rear wheels 2; an engine 4 covered by an engine hood 3 at a forward portion of the machine body A; and a driver section C at a rear portion of the machine body A.

In following description, "F" shown in FIGS. 1 and 2 depicts to indicate the forward direction, "B" the backward direction, "U" the upward direction, "D" the downward direction, "R" the rightward direction, and "L" the leftward direction.

The tractor T further includes: a transmission case 5 in an area extending from a central portion of the machine body A to the back end thereof for varying the driving force of the engine 4; a lift cylinder 6 housed in the transmission case 5 at a rear upper portion thereof; and a pair of right and left lift arms 7 configured to be lifted and lowered in response to operation of the lift cylinder 6.

The tractor T still further includes: a rear power take-off (PTO) shaft 8 protruding backward from the back end of the transmission case 5 for transmitting a driving force to e.g. a rotary tiller work implement (not shown) that is supported by the lift arms 7 to be lifted and lowered. The tractor T further includes a mid PTO shaft 9 protruding forward from a lower face of the transmission case 5 for driving another work implement (not shown) to be provided under the machine body A.

The driver section C includes a driver's seat 11 between right and left rear-wheel fenders 10, a steering wheel 12 in front of the driver's seat 11, and a floor 13 under the driver's seat 11.

The driver section C further includes: an output power control lever 14 protruding upward from a lever guide on an upper face of the rear-wheel fender 10 on the left side of the driver's seat 11; a lifting/lowering control lever 15 protruding upward from a lever guide on an upper face of the rear-wheel fender 10 on the right of the driver's seat 11; and a roll-over protection structure (ROPS) frame 16 standing erect behind the driver's seat 11 and having an inverted U-letter shape.

The driver section C further includes an accelerator pedal 17 on the right side of the floor 13, and a brake pedal 18 on the left side of the floor 13 at a forward portion thereof.

The output power control lever 14 is configured to control a PTO clutch 32 (an example of the "friction clutch"; see FIG. 3) in the transmission case 5 to switch the PTO clutch 32 between an engaged state to permit a driving force to be transmitted to the rear PTO shaft 8, and a disengaged state to block transmission of the driving force. The lifting/lowering control lever 15 is configured to control supply/discharge of operating oil to the lift cylinder 6 to thereby control the lifting/lowering operation of the lift arms 7. Incidentally, the ROPS frame 16 includes pillar-shaped portions standing erect at right and left positions, respectively, behind the driver's seat 11 and having upper ends thereof connected with each other. The ROPS frame 16 is configured to protect the driver seated on the driver's seat 11 in the event of roll-over of the machine body A.

[Transmission Case]

Figure 3:
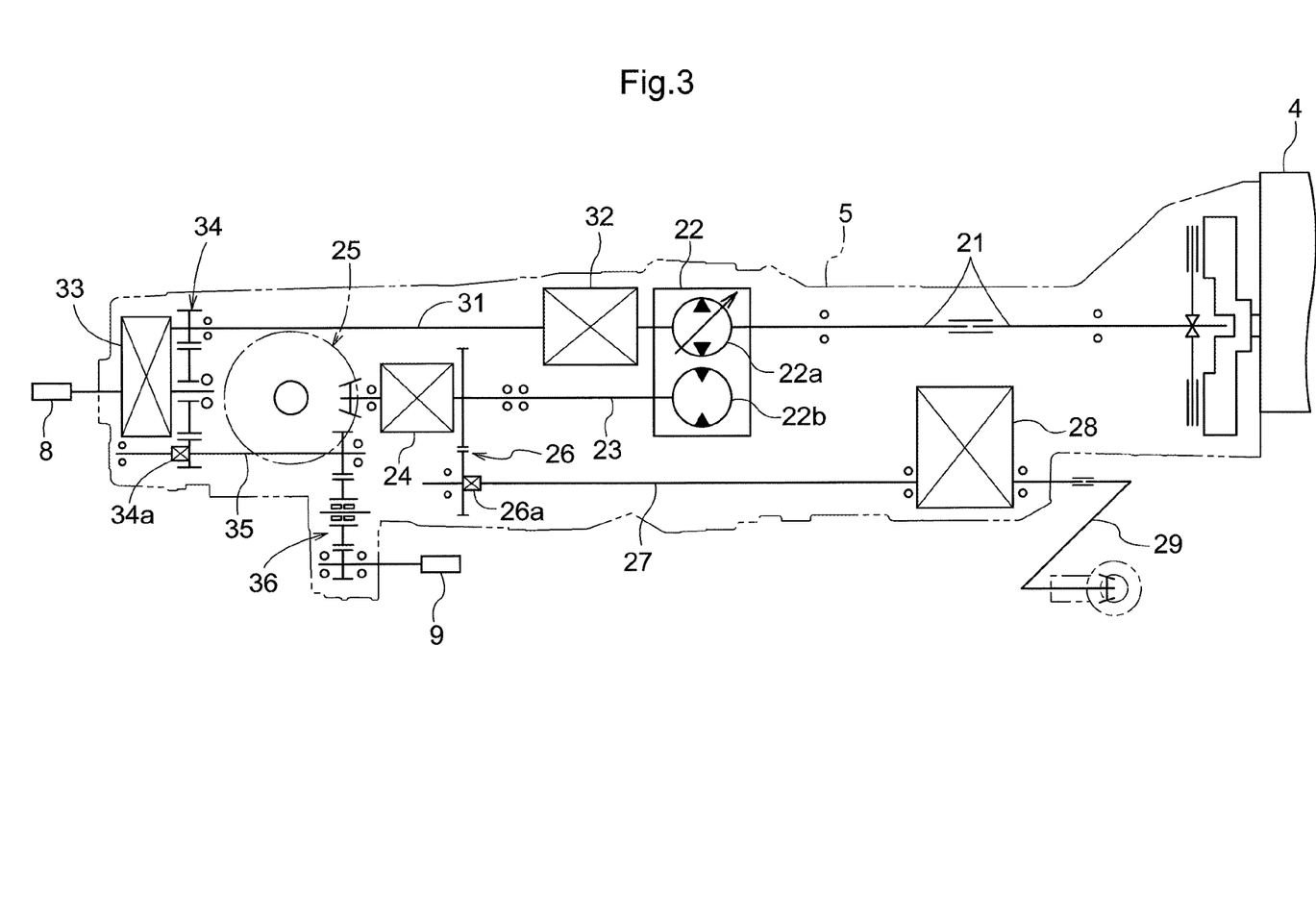
FIG. 3 is a side view illustrating a power transmission arrangement of a transmission case.

As shown in FIG. 3, the transmission case 5 includes: a main drive shaft 21 configured to receive the driving force from the engine 4; a hydrostatic-type continuously variable transmission device 22 (hydrostatic transmission or HST) configured to steplessly vary (speed-change) the driving force from the main drive shaft 21; a varied output shaft 23 configured to transmit the driving force after it is varied steplessly by the continuously variable transmission device 22; a gear shift mechanism 24 configured to vary the driving force of the varied output shaft 23; and a differential gear 25 for the rear wheels 2 configured to receive the driving force from the gear shift mechanism 24.

The continuously variable transmission device 22 includes: a variable displacement pump 22a capable of changing the amount of operating oil to be discharged; and a hydraulic motor 22b configured to be rotated by the operating oil supplied from the variable displacement pump 22a. The continuously variable transmission device 22 is configured to steplessly adjust the drive rate of the hydraulic motor 22b by changing an amount of operating oil supplied from the variable displacement pump 22a. The amount of operating oil supplied from the variable displacement pump 22a is controlled depending on an amount of depression of the accelerator pedal 17 in the driver section C.

The gear shift mechanism 24 includes: a plurality of gears capable of increasing/decreasing (accelerating/decelerating) the drive rate; and a shift gear capable of selectively meshing with one of a plurality of gears, whereby the driver can manually operate the shift gear to select a travel speed.

The transmission case 5 is provided with: an intermediate drive shaft 27 configured to receive the driving force of the varied output shaft 23 via an intermediate power transmission gear mechanism 26; a front-wheel accelerating device 28 capable of increasing the drive rate of the intermediate drive shaft 27; and a front-wheel drive shaft 29 configured to transmit the driving force from the front-wheel accelerating device 28 to the front wheels 1.

The intermediate power transmission gear mechanism 26 includes a front-wheel clutch section 26a capable of being manually operated to permit or block power transmission. Operating the front-wheel clutch section 26a to block power transmission sets the front wheels 1 to a non-driven state, whereas operating the front-wheel clutch section 26a to permit power transmission drives the front wheels 1. The front-wheel clutch section 26a is configured to be operated manually.

Figure 4:
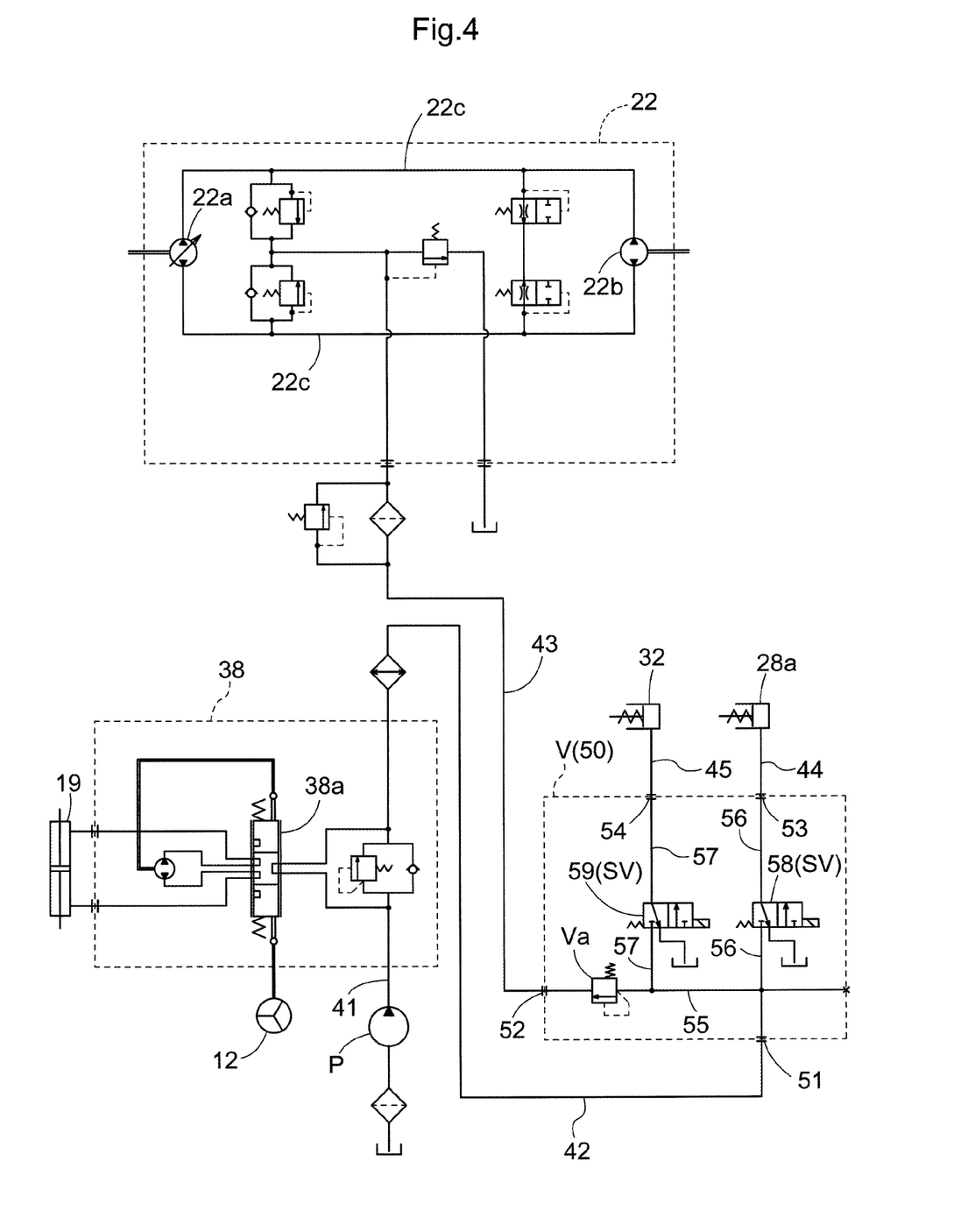
FIG. 4 is a hydraulic circuit diagram of the tractor.
Figure 5:
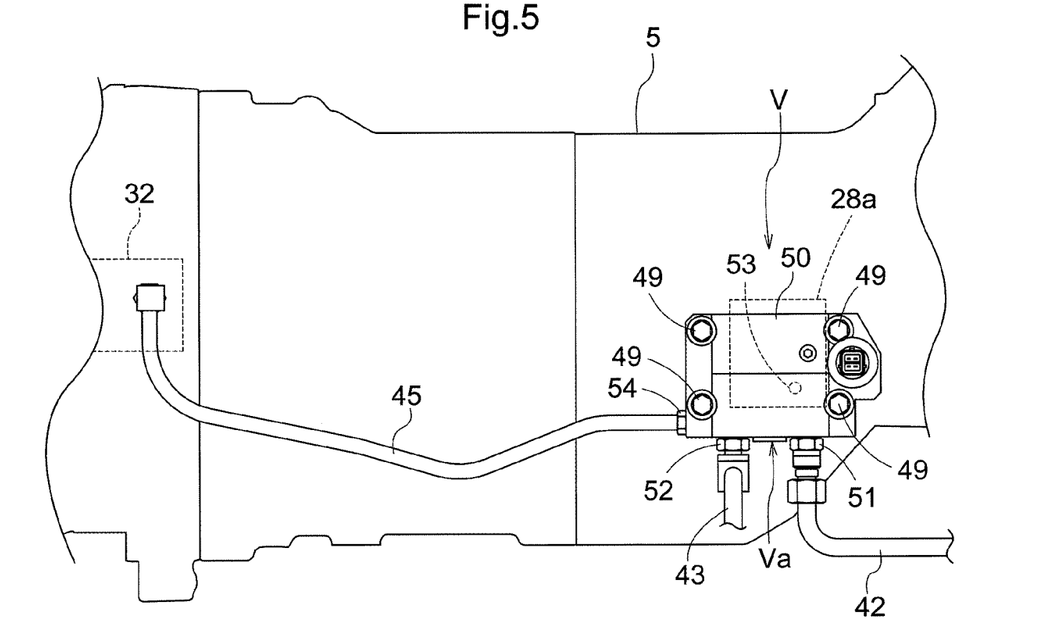
FIG. 5 is a side view of a valve unit attached to a transmission case.

The front-wheel accelerating device 28 includes: a hydraulic front-wheel accelerating clutch 28a (an example of the "friction clutch"; see FIG. 4); and an accelerating gear mechanism (not shown) capable of increasing the drive rate. The front-wheel accelerating clutch 28a is configured to be supplied with operating oil from a valve unit V as shown in FIGS. 4 and 5. The front-wheel accelerating clutch 28a is configured to bring a plurality of friction plates into contact with one another in response to the pressure of the supplied operating oil, to thereby transmit a driving force.

The front-wheel accelerating clutch 28a is configured to be supplied with operating oil when the steering angle of the front wheels 1 exceeds a set value. The front-wheel accelerating clutch 28a is supplied with no operating oil while the steering wheel 12 is not turned greatly, e.g. when the machine body A is traveling straight. As a result, the driving force from the intermediate drive shaft 27 is transmitted to the front-wheel drive shaft 29 without varying the driving force, thereby allowing travel in a constant-rate driving state, in which the front wheels 1 are driven at a circumferential speed equal to that of the rear wheels 2.

On the other hand, when the steering wheel 12 is turned greatly, the front-wheel accelerating clutch 28a is supplied with operating oil. As a result, the driving force of the intermediate drive shaft 27 is increased by the accelerating gear mechanism before transmitting it to the front-wheel drive shaft 29, thereby causing the front wheels 1 to be driven at a circumferential speed higher than the circumferential speed of the rear wheels 2 and allowing the machine body A to turn with a small radius.

The transmission case 5 includes: a work drive shaft 31 arranged coaxial with a portion of the main drive shaft 21 which extends through the continuously variable transmission device 22 in the front-back direction; the multi-disc friction type PTO clutch 32 configured to permit or block transmission of a driving force from the main drive shaft 21 to the work drive shaft 31; and a work transmission mechanism 33 configured to vary a driving force transmitted from the work drive shaft 31 to the rear PTO shaft 8.

The transmission case 5 further includes, at a lower portion thereof, a lower drive shaft 35 configured to receive the driving force from the work drive shaft 31 via a work power transmission gear 34, and a lower power transmission gear mechanism 36 configured to transmit the driving force from the lower drive shaft 35 to the mid PTO shaft 9.

The PTO clutch 32 is configured to bring a plurality of friction plates into contact with one another in response to supply of operating oil, to thereby transmit a driving force to the rear PTO shaft 8 and the mid PTO shaft 9. The work power transmission gear 34 includes a work clutch section 34a capable of being manually operated to permit or block power transmission. Operating the work clutch section 34a to block power transmission sets the mid PTO shaft 9 to a non-driven state, whereas operating the work clutch section 34a to permit power transmission drives the mid PTO shaft 9.

[Hydraulic Circuit]

The tractor T includes an oil-passage structure as shown in FIG. 4. In the oil-passage structure, operating oil is supplied from a hydraulic pump P through a first oil passage 41 to a hydraulic power steering unit 38; and the operating oil from the power steering unit 38 is supplied through a second oil passage 42 to a valve unit V. Further, the operating oil from the valve unit V is supplied through a third oil passage 43 to the continuously variable transmission device 22. Incidentally, the hydraulic pump P may be driven by any one of an electric motor and the engine 4.

Figure 6:
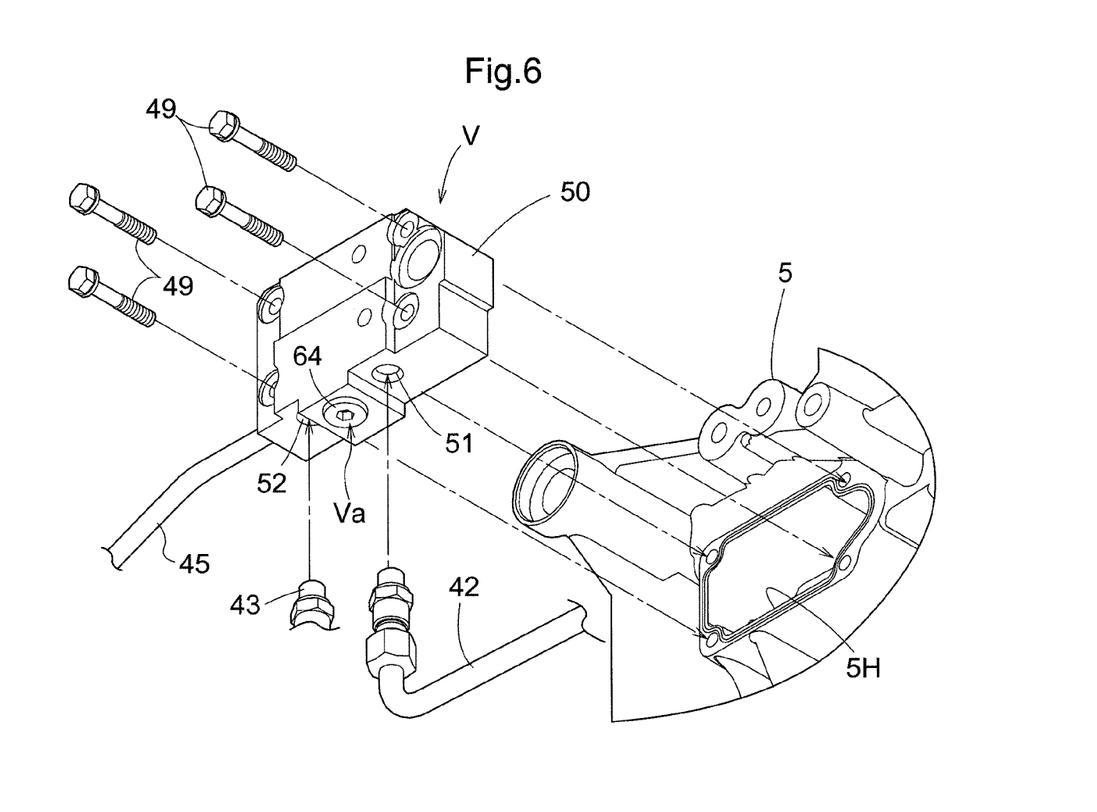
FIG. 6 is a perspective view of a valve unit.

As shown in FIGS. 4 to 6, the hydraulic circuit includes a first clutch control oil passage 44 configured to supply, to the front-wheel accelerating clutch 28a of the front-wheel accelerating device 28, operating oil having a pressure adjusted by the valve unit V to a set level; and a second clutch control oil passage 45 configured to supply the same operating oil to the PTO clutch 32.

The power steering unit 38 is configured to operate a steering valve 38a in response to operation of the steering wheel 12, whereby operating oil is supplied and discharged between the steering valve 38a and a double-acting steering cylinder 19. The steering cylinder 19 is provided on the machine body A and configured to control the front wheels 1.

The continuously variable transmission device 22 includes the variable displacement pump 22a and the hydraulic motor 22b as described above, and uses the operating oil supplied through the third oil passage 43 as charge oil to be supplied to a circuit 22c between the variable displacement pump 22a and the hydraulic motor 22b.

[Valve Unit for Hydraulic Circuit]

Figure 8:
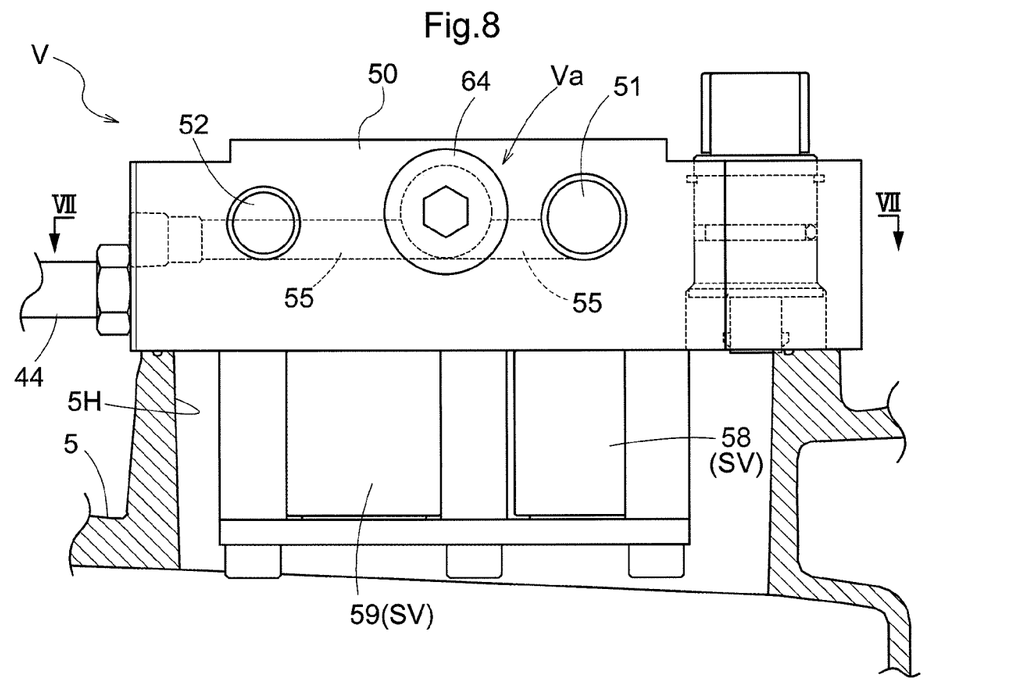
FIG. 8 is a bottom plan view of a valve unit attached to the transmission case.
Figure 9:
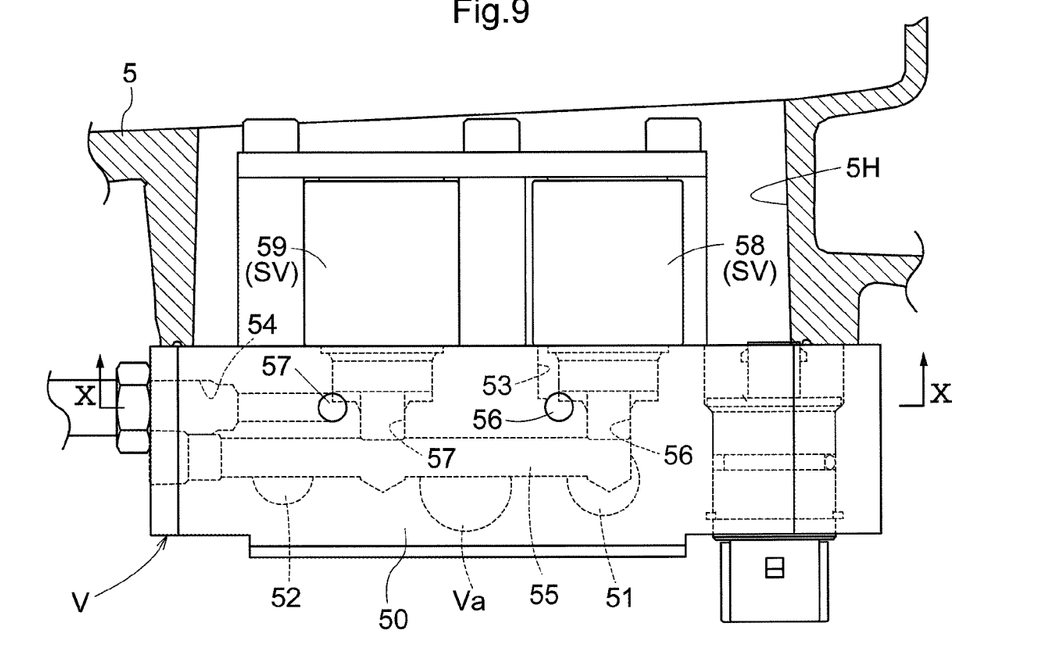
FIG. 9 is a top plan view of a valve unit attached to a transmission case.
Figure 10:
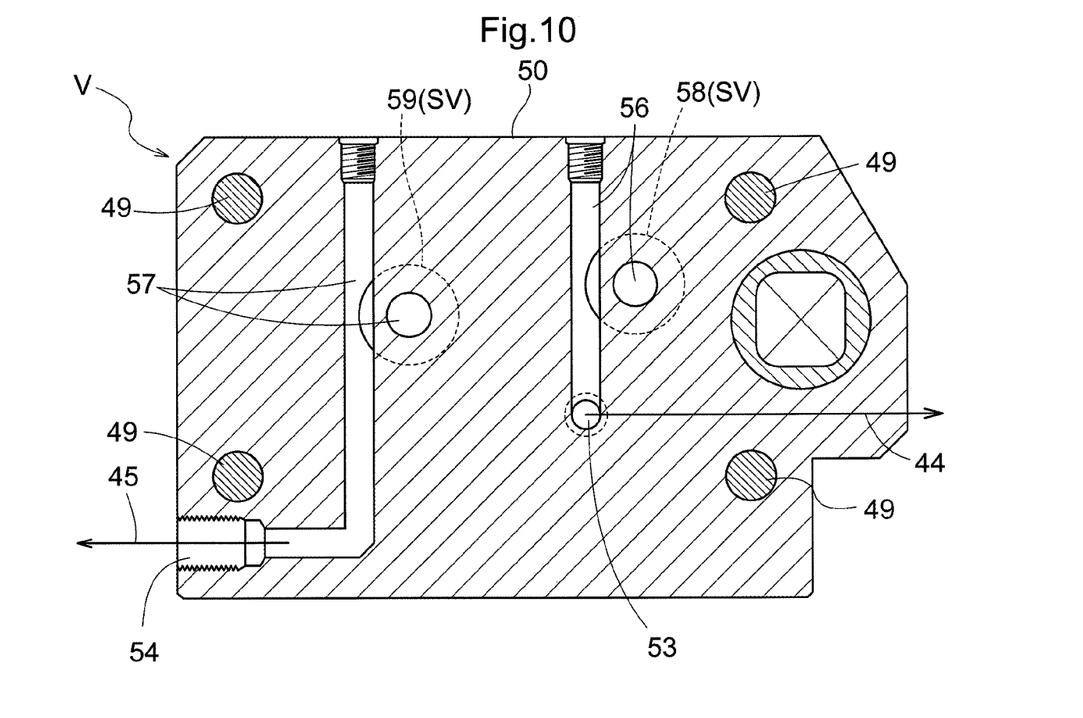
FIG. 10 is a view in section taken on X-X in FIG. 9.

As shown in FIGS. 6, 8 and 9, the transmission case 5 includes a side wall with an opening 5H. The valve unit V is attached to the transmission case 5 by a plurality of fixation bolts 49 at such a position as to cover the opening 5H. When the valve unit V is attached as such, a surface thereof exposed to the outside is referred to as an "outer surface", and an opposite surface to the external surface is referred to as a "reverse surface".

As shown in FIGS. 4-10, the valve unit V includes a valve housing 50 having a pump port 51, a discharge port 52, a first control port 53 and a second control port 54. In particular, the discharge port 52 is formed in an inner surface of the valve housing 50. When the valve unit V is attached to the transmission case 5, the pump port 51 and the discharge port 52 are positioned on a lower face of the valve housing 50; the first control port 53 is positioned on an inner face of the valve housing 50, and the second control port 54 is positioned on a back face of the valve housing 50.

As shown in FIGS. 5 and 6, with the above arrangement, the second oil passage 42 in the form of a conduit is connected to the pump port 51; the third oil passage 43 in the form of a conduit is connected to the discharge port 52; the first clutch control oil passage 44 in the form of a conduit is connected to the first control port 53; and the second clutch control oil passage 45 in the form of a conduit is connected to the second control port 54. Since the first control port 53 is present on an inner surface of the valve housing 50, the first clutch control oil passage 44 enters the space inside the transmission case 5 through the opening 5H.

The valve housing 50 contains a supply oil passage 55 configured to be supplied with operating oil from the pump port 51. The valve housing 50 further contains a pressure adjustment valve Va configured to adjust the pressure of the supply oil passage 55. That portion of the supply oil passage 55 which is present downstream of the pressure adjustment valve Va is connected to the discharge port 52.

A first control oil passage 56 (an example of the "branch oil passage") and a second control oil passage 57 (an example of the "branch oil passage") are connected to and branched out of the supply oil passage 55 at positions thereof between the pump port 51 and the pressure adjustment valve Va. The first control oil passage 56 is provided with a first control valve 58 in the form of a solenoid valve SV. The second control oil passage 57 is provided with a second control valve 59 in the form of a solenoid valve SV.

As shown in FIG. 4, the first control oil passage 56 extends from upstream of the first control valve 58 to downstream thereof, and the second control oil passage 57 extends from upstream of the second control valve 59 to downstream thereof. The term "upstream" above refers to the upstream side with respect to the direction of the flow of operating oil from the hydraulic pump P.

The solenoid valves SV (collective nomination of the first control valve 58 and the second control valve 59) include respective electromagnetic solenoid sections protruding backward from the back face of the valve housing 50. Each of the electromagnetic solenoid portions enters the opening 5H in the transmission case 5.

As shown in FIG. 4, the first control oil passage 56 is connected to the first clutch control oil passage 44, and the second control oil passage 57 is connected to the second clutch control oil passage 45.

Figure 7:
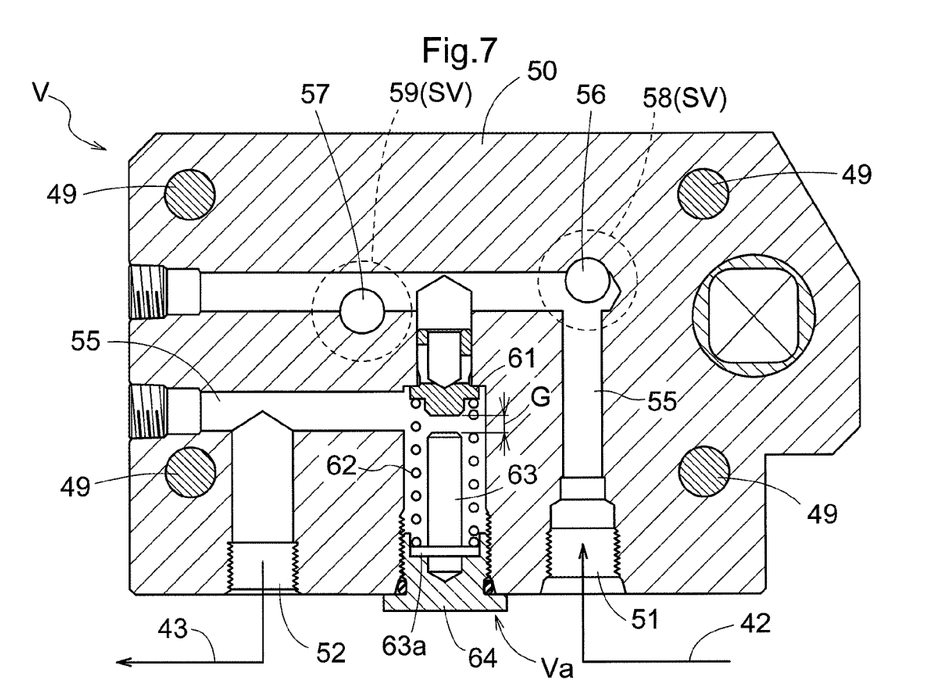
FIG. 7 is a view in section taken on VII-VII in FIG. 8.

The pressure adjustment valve Va has configuration thereof in common with a relief valve. Specifically, as shown in FIG. 7, the pressure adjustment valve Va includes a pressure adjustment valve body 61, a compression coil spring 62, a restriction member 63, and a plug 64 supporting the above members. The pressure adjustment valve Va keeps closing when the pressure of the supply oil passage 55 is smaller than a set value, and opens when the pressure of the supply oil passage 55 is equal to or greater than the set value.

Specifically, the pressure adjustment valve body 61 is so positioned as to be capable of opening and closing the supply oil passage 55. The spring 62 applies, to the pressure adjustment valve body 61, an urging force that keeps the pressure adjustment valve body 61 at a closed position when the supply oil passage 55 has a pressure smaller than a set value, and that allows the pressure adjustment valve body 61 to open when the pressure of the supply oil passage 55 is equal to or greater than the set value.

The restriction member 63 is in the shape of a shaft that is present inside the coil of the spring 62 and that has an axis extending concentric with the center of the coil. When the pressure adjustment valve body 61 becomes open against the urging force of the spring 62 in response to the pressure of operating oil, the restriction member 63 is configured to abut against the pressure adjustment valve body 61 to restrict movement of the pressure adjustment valve body 61. In other words, as shown in FIG. 7, (i) the operation axis of the pressure adjustment valve body 61, along which the pressure adjustment valve body 61 is operated, (ii) the center of the coil of the spring 62 and (iii) the axis of the restriction member 63 in the shape of a shaft extend concentric with one another; and that the restriction member 63 is present inside the coil of the spring 62.

As shown in FIG. 7, the pressure adjustment valve body 61 is, when closed, separated from a protruding end of the restriction member 63 by a gap G. When the pressure adjustment valve body 61 becomes open, the restriction member 63 restricts the operation of the pressure adjustment valve body 61 so that the pressure adjustment valve body 61 will not be moved by an amount exceeding the gap G. This prevents the spring 62 from becoming plastically deformed by excessive compression and prevents the urging force of the spring 62 from becoming decreased, thereby maintaining its spring constant.

The restriction member 63 integrally includes, at a base end thereof, a disc-shaped portion 63a abutting against an inner face of the plug 64. The spring 62 has an end thereof, opposite to the pressure adjustment valve body 61, contacted with the peripheral edge of the disc-shaped portion 63a. This allows the restriction member 63 to be oriented stably.

Incidentally, a pressure on the supply oil passage 55 at a portion thereof upstream of the pressure adjustment valve Va depends on the urging force of the spring 62 of the pressure adjustment valve Va. Each of the first control port 53 connected to the first control oil passage 56 and the second control port 54 connected to the second control oil passage 57 serves to supply operating oil to a friction clutch.

Typically, such a friction clutch can be kept engaged even with the operating oil having a lower pressure, compared with the pressure of operating oil to be supplied to a hydraulic cylinder that drives e.g. a bucket and an arm of an excavator adapted to be connected to a tractor. Thus, operating oil supplied through the first control port 53 and the second control port 54 has a relatively low pressure. This allows the pressure on the spring 62 to be reduced, and effectively prevents plastic deformation of the spring 62.

[Solenoid Valves]

Figure 11:
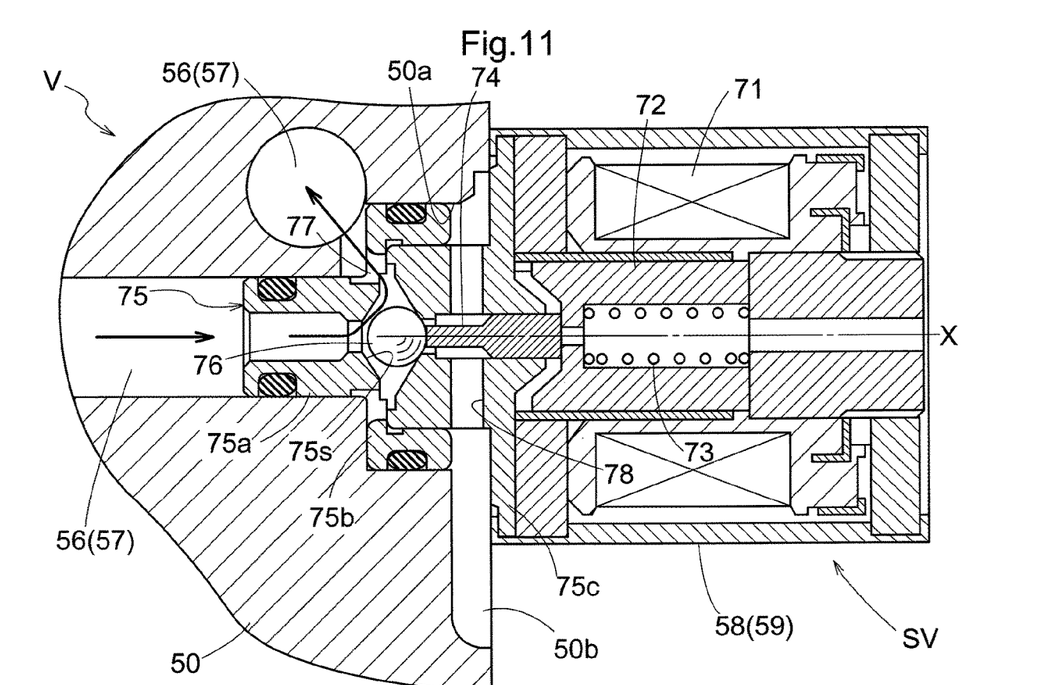
FIG. 11 is a view in section of a solenoid valve in its open state.
Figure 12:
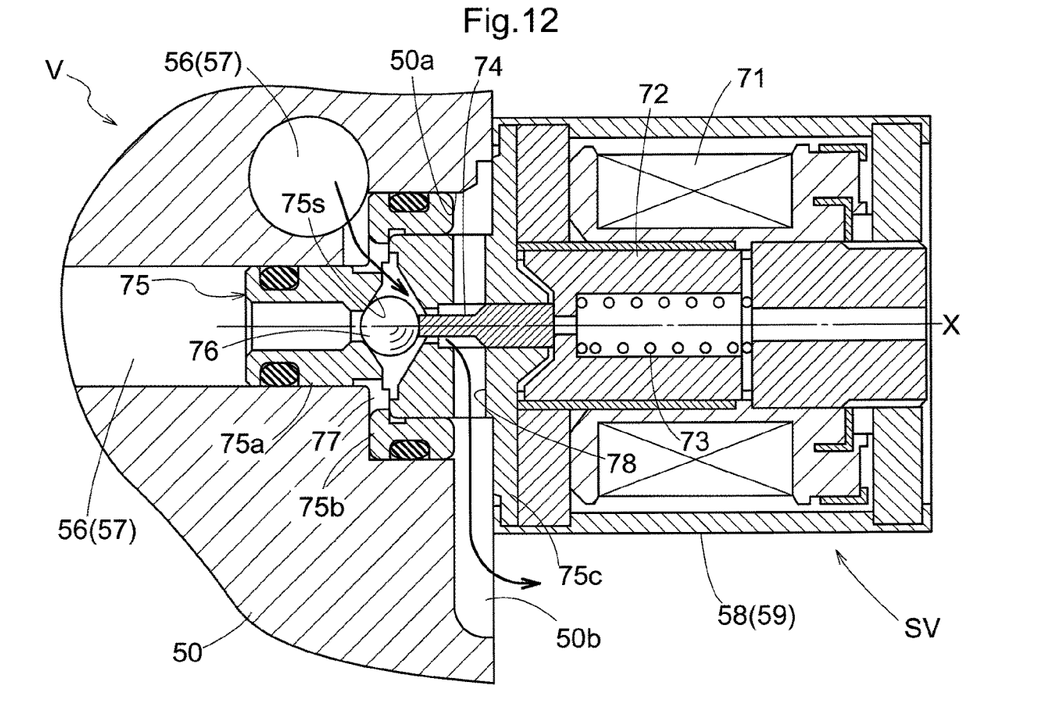
FIG. 12 is a cross-sectional view of the solenoid valve in its closed state.

The solenoid valves SV (namely, the first control valve 58 and the second control valve 59) basically share a configuration thereof as shown in FIGS. 11 and 12. Basically, reference signs in the figures depict those of the first control valve 58.

A portion of each of the above-described first control oil passage 56 and second control oil passage 57 directly connected to the supply oil passage 55 extends in the valve housing 50 orthogonally to a virtual plane on which the supply oil passage 55 is present. In contrast, each of a portion of the first control oil passage 56 downstream of the first control valve 58 and a portion of the second control oil passage 57 downstream of the second control valve 59 extends along a virtual plane parallel to the virtual plane on which the supply oil passage 55 is present.

As shown in FIGS. 11 and 12, each solenoid valve SV is in the shape of a rotating body about an axis X as the center, and includes: an electromagnetic solenoid section that includes: an electromagnetic solenoid 71 configured to generate magnetic force; a plunger 72 made of a magnetic material and configured to be operated under the magnetic force; a compression spring body 73 configured to apply urging force that keeps the plunger 72 at a standard position; and a shaft body 74 configured to be operated together with the plunger 72. Further, each electromagnetic solenoid section integrally includes a connection body 75. The shaft body 74 extends coaxial with the axis X and capable of being moved outward and inward along the axis X.

The connection body 75 integrally includes: a first fit-in portion 75a in the shape of a column coaxial with the axis X; a second fit-in portion 75b in the shape of a column coaxial with the axis X; and a large-diameter portion 75c in the shape of a disc coaxial with the axis X. The connection body 75 has a through hole coaxial with the axis X.

The first fit-in portion 75a has the smallest diameter among the three portions, and is fitted in an end of the first control oil passage 56 (second control oil passage 57). The second fit-in portion 75b has a diameter larger than the diameter of the first fit-in portion 75a, and is fitted in a fitting depression 50a present in the valve housing 50 and coaxial with the first control oil passage 56 (second control oil passage 57). The large-diameter portion 75c has the largest diameter among the three portions, and abuts against the reverse surface (outer surface) of the valve housing 50.

In particular, the fitting depression 50a is connected to a portion of the first control oil passage 56 (second control oil passage 57) downstream of the first control valve 58 (second control valve 59).

The connection body 75 contains a ball-shaped valve body 76 in a valve space inside a boundary portion between the first fit-in portion 75a and the second fit-in portion 75b. The connection body 75 has a control hole portion 77 that is present in a radial direction and that is connected to the valve space at a boundary portion between the first fit-in portion 75a and the second fit-in portion 75b. The control hole portion 77 is connected to the fitting depression 50a.

The connection body 75 further has a drain hole portion 78 connected to the through hole at a boundary portion between the second fit-in portion 75b and the large-diameter portion 75c. The drain hole portion 78 is connected to a drain groove 50b in the reverse surface of the valve housing 50.

The valve space has an abutting face 75s, which is a funnel-shaped inner face. While the electromagnetic solenoid 71 is not driven as shown in FIG. 12, the compression spring body 73 applies an urging force via the shaft body 74 to the ball-shaped valve body 76, and this pressure keeps a sealed or closed state, in which the ball-shaped valve body 76 abuts against the abutting face 75s.

In this closed state, operating oil is prevented from flowing into the first control oil passage 56 (second control oil passage 57) connected to the supply oil passage 55. Further, when the closed state is achieved, operating oil at a portion of the first control oil passage 56 (second control oil passage 57) which portion is downstream of the solenoid valve SV is discharged through the control hole portion 77, the valve space and the drain hole portion 78 into the drain groove 50b, thereby greatly reducing the pressure on the first clutch control oil passage 44 (second clutch control oil passage 45).

In contrast, when the electromagnetic solenoid 71 has become driven as shown in FIG. 11, the solenoid valve SV becomes open.

Specifically, when the electromagnetic solenoid 71 is driven, the shaft body 74 is displaced in a direction away from the ball-shaped valve body 76 against the urging force of the compression spring body 73. This displacement releases the ball-shaped valve body 76 from the urging force of the compression spring body 73. Then, operating oil from the first control oil passage 56 (second control oil passage 57) connected to the supply oil passage 55 applies pressure to the ball-shaped valve body 76 so that the ball-shaped valve body 76 becomes apart from the abutting face 75s and abuts against the face opposite to the abutting face 75s. This prevents operating oil from flowing from the valve space into the drain hole portion 78.

This allows operating oil from the first control oil passage 56 (second control oil passage 57) connected to the supply oil passage 55 to be supplied to the portion of the first control oil passage 56 (second control oil passage 57) downstream of the solenoid valve SV. This in turn allows operating oil to be supplied to the front-wheel accelerating clutch 28a or the PTO clutch 32.

When the electromagnetic solenoid 71 has become non-driven, the solenoid valve SV becomes closed. This stops supply of operating oil to the front-wheel accelerating clutch 28a or the PTO clutch 32, and also starts discharge of operating oil for either of the friction clutches from the drain hole portion 78 into the drain groove 50b. This in turn disengages the friction clutch.

[Operational Effects of Embodiment]

The tractor T includes a hydraulic circuit configured as described above. The hydraulic circuit causes the pressure of operating oil supplied from the hydraulic pump P to the valve unit V to be increased by the pressure adjustment valve Va to a set value, and then causes the operating oil to be supplied to the PTO clutch 32 or the front-wheel accelerating clutch 28a of a multi-disc friction type. This prevents a slip of friction plates (incomplete clutching) resulting from insufficient pressure.

The pressure adjustment valve Va is configured similarly to a relief valve; it includes a pressure adjustment valve body 61 and a spring 62. This eliminates the need to include a complicated valve as the pressure adjustment valve Va, and thereby prevents a cost increase. In particular, the pressure adjustment valve Va includes a restriction member 63. The pressure adjustment valve body 61 is, when closed, separated from a protruding end of the restriction member 63 by a gap G. When the pressure adjustment valve body 61 becomes open, the restriction member 63 restricts the operation of the pressure adjustment valve body 61 so that the pressure adjustment valve body 61 will not be moved by an amount exceeding the gap G. This prevents the spring 62 from becoming plastically deformed by excessive compression and prevents the urging force of the spring 62 from becoming decreased, thereby maintaining its spring constant.

The valve unit V includes a single valve housing 50 that has a plurality of oil passages and that contains a pressure adjustment valve Va and a plurality of solenoid valves SV. This allows the hydraulic circuit to be configured and maintained easily as compared to, for example, an arrangement including a conduit connecting a pressure adjustment valve Va to a plurality of solenoid valves SV.

Modified Embodiments

The present invention may be embodied in various ways other than the foregoing embodiment. In other/modified embodiments to be described below, identical reference numerals/marks are appended to any elements that are identical in function to those in the foregoing embodiment.

Figure 13:
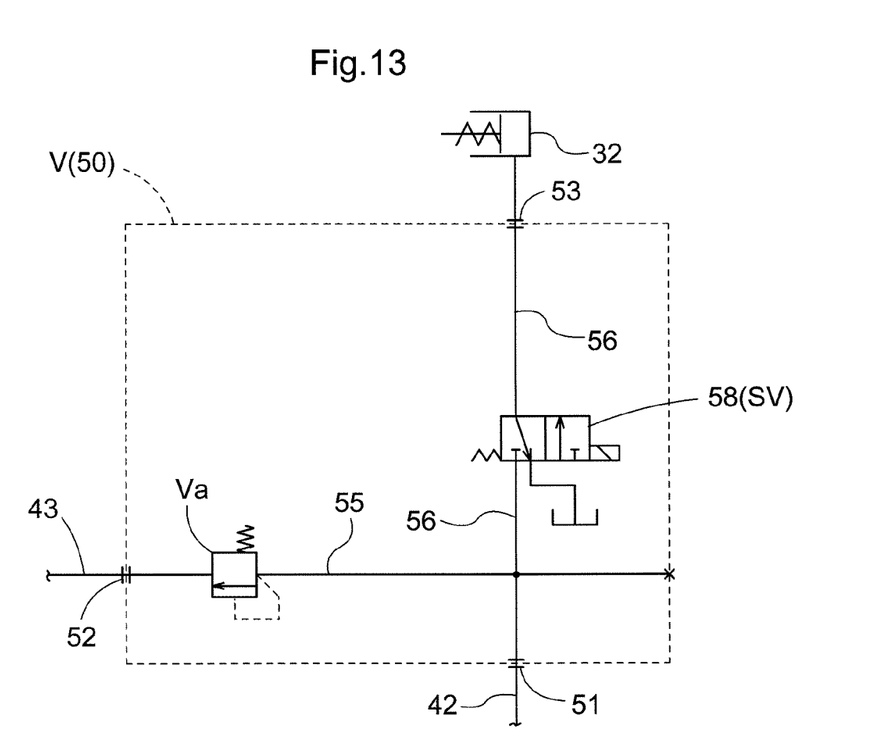
FIG. 13 is a diagram showing a hydraulic circuit according to Modified Embodiment (a).

(a) As shown in FIG. 13, the valve unit V may include a valve housing 50 containing a pressure adjustment valve Va and a single solenoid valve SV so that operating oil is supplied to a single friction clutch.

The valve unit V in modified embodiment (a) is similar to the valve unit V in the foregoing embodiment in that it includes a first control valve 58 and oil passages for use in combination therewith. However, the valve unit V does not include a second control valve 59 and oil passages to be used in combination therewith.

The valve unit V in modified embodiment (a) may be further modified, such that the valve housing 50 contains a pressure adjustment valve Va, and three or more solenoid valves SV to supply operating oil to three or more elements associated therewith.

Production of a valve unit V configured as above may involve use of a valve housing 50 sized equally to an element configured to supply operating oil to a plurality of hydraulic actuators. This allows commonality of structures for attachment of a valve unit V to a transmission case 5 even for tractors T with different specifications, for example.

(b) The restriction member 63 may be configured such that the gap G between the pressure adjustment valve body 61 in its closed state and the protruding end of the restriction member 63 may be adjusted. Specifically, the restriction member 63 has a base end with an external thread, while the plug 64 is provided with an internal thread engageable with the external thread. Then, the plug 64 may be operated externally to rotate the restriction member 63.

The modified embodiment (b) as configured above can not only prevent an excessive increase in the pressure of operating oil in the supply oil passage 55, but also prevent a decrease in the urging force of the spring 62 by selecting a gap G that allows the spring 62 to have a small compressing amount.

(c) The restriction member 63 is not necessarily in the shape of a shaft; it may be alternatively arranged to abut against e.g. a peripheral protruding portion of the pressure adjustment valve body 61 when the pressure adjustment valve body 61 is operated in a direction in which the spring 62 is compressed. This arrangement places the restriction member 63 outside the periphery of the coil of the spring 62, and thus allows the restriction member 63 to be used in position, even if the pressure adjustment valve Va includes a spring 62 with a small coil diameter.

(d) The restriction member 63 may be integral with the plug 64. This reduces the number of parts.

(e) The restriction member 63 may be integral with the pressure adjustment valve body 61. With this arrangement, when the pressure adjustment valve body 61 becomes open, the restriction member 63 is operated together with the pressure adjustment valve body 61, so that an end of the restriction member 63 abuts against the plug 64. The above arrangement can, however, prevent the spring 62 from becoming plastically deformed by excessive compression.

(f) The pressure adjustment valve body 61 is not necessarily operated in the up-down direction; it may alternatively be operated in a lateral direction, for example. This allows the valve unit V to have any orientation.

What is claimed is:

1. A valve unit comprising:
a valve housing comprising:
a supply oil passage configured to receive operating oil from a hydraulic pump, and
a pressure adjustment valve configured to adjust a pressure of the supply oil passage,
wherein the pressure adjustment valve comprises:
a pressure adjustment valve body configured to open and close the supply oil passage;
a compression coil spring applying, to the pressure adjustment valve body, an urging force that keeps the pressure adjustment valve body at a closed position when the pressure of the supply oil passage is smaller than a set value and that allows the pressure adjustment valve body to open when the pressure of the supply oil passage is not smaller than the set value; and
a restriction member configured to, when the pressure adjustment valve body becomes open against the urging force of the spring in response to a pressure of the operating oil, abut against the pressure adjustment valve body to restrict movement of the pressure adjustment valve body, and when the pressure adjustment valve body is closed, the pressure adjustment valve body is separated from the restriction member,
wherein the pressure adjustment valve body has an operation axis along which the pressure adjustment valve body is operated,
wherein the spring has an axis,
wherein the restriction member is in a shape of a shaft having an axis, and
wherein the operation axis of the pressure adjustment valve body, the axis of the spring, and the axis of the restriction member extend concentric with one another,
wherein the pressure adjustment valve body includes a contact portion that extends inside the spring towards the restriction member and is configured to abut against the restriction member,
wherein the restriction member is disposed inside the spring, and wherein the movement of the pressure adjustment valve body is restricted by the contact portion and the restriction member being brought into contact with each other, and wherein a projecting length of the contact portion inside the spring is less than a projecting length of the restriction member inside the spring.

2. A work machine comprising:

the valve unit according to claim 1, wherein:

the hydraulic pump is provided for the work machine that includes a power steering unit of a hydraulic type and a continuously variable transmission device of a hydrostatic type, the supply oil passage receives, upstream of the pressure adjustment valve, the operating oil having passed through the power steering unit, and the operating oil downstream of the pressure adjustment valve in the supply oil passage is supplied to the continuously variable transmission device as charge oil.

3. The valve unit according to claim 1, wherein:

the valve housing includes a pump port through which the operating oil is supplied from the hydraulic pump to the supply oil passage, and a discharge port through which the operating oil downstream of the pressure adjustment valve in the supply oil passage is discharged, the valve housing includes a branch oil passage that is branched out of the supply oil passage and that is configured to receive the operating oil upstream of the pressure adjustment valve in the supply oil passage, the valve housing has a control port through which the operating oil from the branch oil passage exits, and there is provided a solenoid valve that is configured to electromagnetically open and close the branch oil passage.

4. A work vehicle comprising:

the valve unit according to claim 3, wherein the operating oil exiting through the control port is supplied to a friction clutch, and the pressure set by the pressure adjustment valve is a value sufficient to keep the friction clutch engaged.

* * * * *